United States Patent [19]

Braun et al.

[11] Patent Number: 4,637,268

[45] Date of Patent: Jan. 20, 1987

[54] PLANER DRIVE

[75] Inventors: Gert Braun; Ernst Braun, both of Essen-Heisingen, Fed. Rep. of Germany

[73] Assignee: Halbach & Braun Industrieanlagen, Fed. Rep. of Germany

[21] Appl. No.: 769,867

[22] Filed: Aug. 27, 1985

[30] Foreign Application Priority Data

Sep. 5, 1984 [DE] Fed. Rep. of Germany ....... 3432551

[51] Int. Cl.[4] .............................................. F16H 15/00
[52] U.S. Cl. ................................... 74/190; 192/93 C;
474/273
[58] Field of Search .......................... 474/273; 299/36;
74/190; 192/93 C

[56] References Cited

U.S. PATENT DOCUMENTS

| 1,760,223 | 5/1930 | Wittkuhns | 192/93 C |
| 2,506,713 | 5/1950 | Fast | 192/93 C |
| 2,744,499 | 5/1956 | Mann | 192/93 C X |

*Primary Examiner*—James A. Leppink
*Assistant Examiner*—Frank H. McKenzie, Jr.
*Attorney, Agent, or Firm*—McGlew and Tuttle

[57] ABSTRACT

A planer drive includes a sprocket wheel for a planing chain, the sprocket wheel having a secondary chain ring, and a driveshaft has a primary chain ring. On at last two circles juxtaposed at a predetermined distance, the primary chain ring has radial holes for clutch pins, conical friction segments attached to the clutch pins forming two revolving friction rings whose outside flanks work against an annular groove of the secondary chain ring. Between the two friction rings on the primary side, the secondary chain ring has a centrally engaging friction ring of appropriate taper which works against the inner flanks of the friction rings on the secondary side. The friction ring on the secondary side is mounted so as to be axially movable so that uniform engagement, reduced wear due to low specific contact pressure and better heat dissipation are assured while emergency operating properties are maintained.

6 Claims, 3 Drawing Figures

PLANER DRIVE

FIELD AND BACKGROUND OF THE INVENTION

This invention relates in particular to the construction of mining planers and in particular to a new and useful drive for a planer having a sprocket chain.

The invention relates particularly to a planer drive with a sprocket wheel for a planing chain and a driveshaft for the sprocket wheel, the sprocket wheel having a secondary chain ring and the driveshaft a primary chain ring and forming a friction clutch. The secondary chain ring has a revolving, conical, annular groove associated with the primary chain ring and the primary chain ring has radial holes distributed over its circumference and associated with an annular groove for the accommodation of clutch pins. Conical pin heads of the clutch pins are wedgeable in the annular groove, for which purpose a freely mounted centering ring with a wedge surface working against the pin bases is axially/radially adjustable in the primary chain ring by means of a pressure ring. The conical pin heads are designed as friction segments attached to the clutch pins.

A similar planer drive is known, in which the friction clutch or its clutch elements are already characterized by low wear because different materials are used both for the clutch pins and for the conical pin heads. While the strength characteristics are of major importance for the clutch pins, the friction coefficients and the wear characteristics are of primary importance for the conical pin heads. In addition, soft engagment and uniform absorption of power peaks to prevent overloads are achieved.

The invention provides a planer drive whose friction clutch is characterized by reduced specific contact pressure and assures that friction heat, resulting from slippages when engaging, is dissipated unobjectionably.

In such a planer drive the invention solves this problem in that the primary chain ring has radial holes for the clutch pins on at least two circles juxtaposed at a predetermined distance and the friction segments attached to the clutch pins form two revolving friction rings whose outer flanks work against the annular groove flanks, and in that the secondary chain ring has, at least on one circle located in projection between the two circles on the primary side, a friction ring immersing centrally between the two friction rings on the primary side, and working with an appropriate amount of tape against the inner flanks of the rings. The friction ring on the secondary side is mounted so as to be axially movable in the annular groove. The consequence of these measures of the invention is that the friction rings, mutually engaging alternately, form a disc clutch in which the central friction ring, due to its axial mobility, always assures perfect compensation of wear on the friction rings, even when not uniform. The taper of the mutually engaging friction rings contributes to this also so that the flank contact is always perfect. Since the friction area is considerably enlarged due to the mutually engaging friction rings, a considerable reduction of the specific contact pressure is also achieved, and the friction heat caused by slippage can be dissipated through large areas. This virtually prevents "seizing" of the friction rings, and the so-called emergency operating characteristics are maintained at all times, because an oil film forming between the friction surfaces of the friction rings does not break down on account of the low specific contact pressures. The clutch pins are also stressed considerably less because of the lower specific contact pressures. While the friction clutch of the known planer drive, having one friction ring, can be used only up to 200 kW, possibly 250 kW motor capacity, the friction clutch according to the invention is suited for motor capacities up to more than 300 kW. Soft engagement and reduced wear are always assured. The essential advantages obtained by the invention are seen therein.

Other significant features of the invention are enumerated below. One independently significant suggestion of the invention provides for the secondary chain ring to have, distributed over its circumference, on a circle coaxial to the friction ring on the secondary side, radial holes to accommodate clutch pins with conical friction segments forming the secondary friction ring. A particularly flexible adaptation of the central friction ring to the two outer friction rings which are radially movable towards the central friction ring via the wedge surface of the centering ring is achieved in this manner. The friction segments of the friction rings on the primary side may be mutually staggered in accordance with the sprocket wheel gaps so as to avoid, with certainty, canting between the friction segments of the central friction ring and the two outer friction rings. For, the central friction ring or the friction ring on the secondary side is preferably divided into three or four friction segments, with each of which are associated several clutch pins fixed in their radial holes. These clutch pins serve the purpose of fixing the friction segments of the secondary friction ring in circumferential directions while not impairing their axial mobility. For exial mobility, the secondary chain ring has an appropriately wide, revolving, channel-like bearing recess in the annular groove area, which recess is engaged by the secondary clutch pins and friction segments in the area of the segment base.

Accordingly, it is an object of the invention to provide an improved drive for a planer wherein a clutching engagement is effected between the drive shaft and a sprocket chain ring through radially extending pins having friction pinheads which are adjustably engaged against the flank of a revolving groove of the sprocket wheel.

A further object of the invention is to provide a drive which is simple in design, rugged in construction and economical to manufacuture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
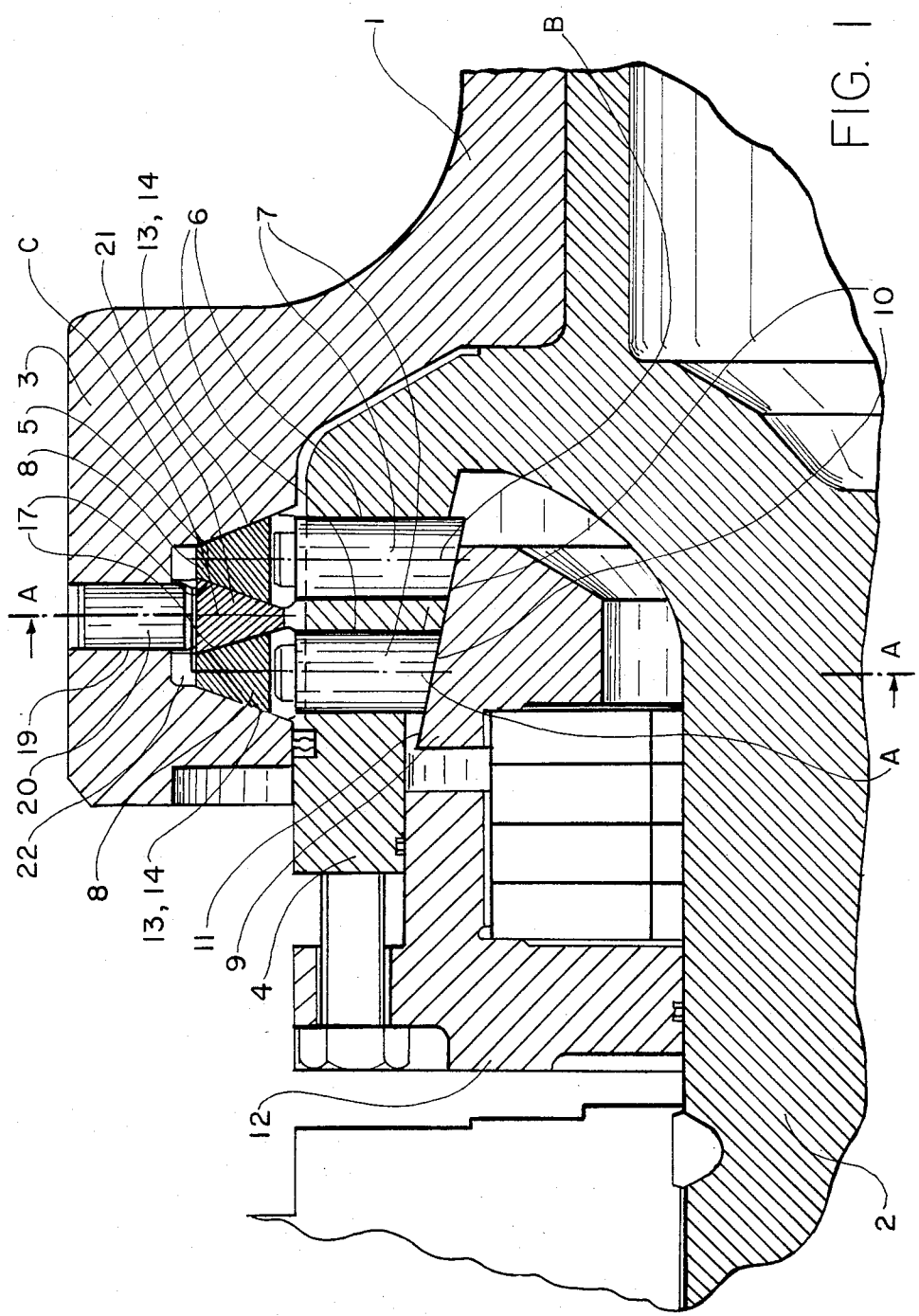
FIG. 1 is a partial axial sectional view of a planer drive according to the invention.
Figure 2:
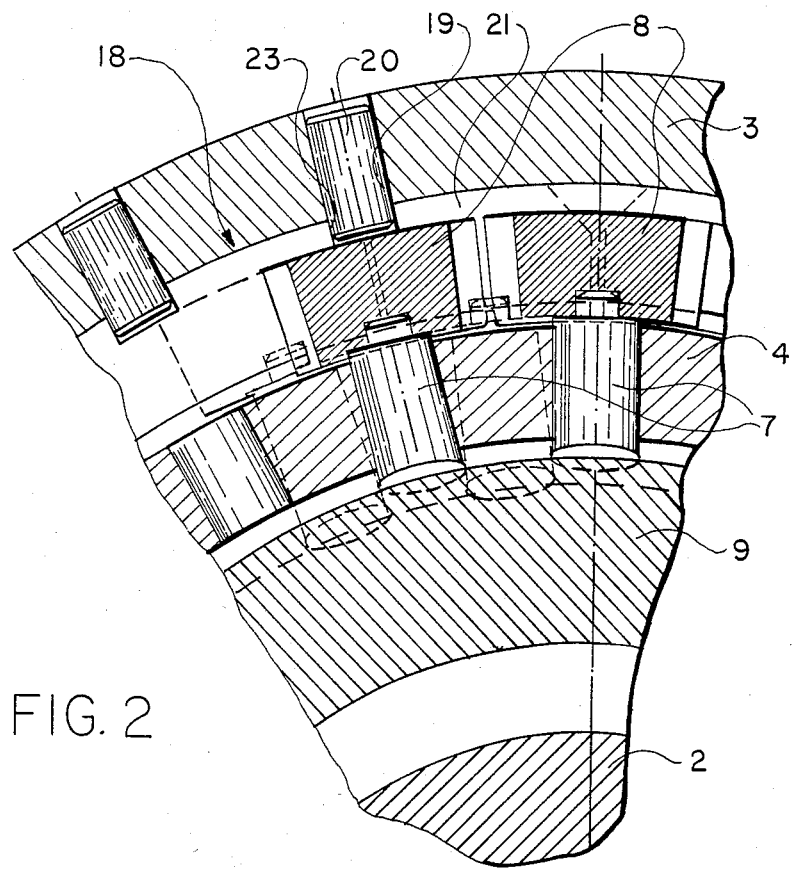
FIG. 2 is a partial radial sectional view along line A—A of FIG. 1.

Referring to the drawings in particular, the invention embodied therein comprises a drive for a planer between a drive shaft 2 and a sprocket wheel 1 which is effected in accordance with the invention through clutch pins 7 which are adjustably wedged radially outwardly for effecting engagement of a conically shaped pinhead segment portion of the radially movable clutch pins which are acted upon on the secondary side by similarly shaped frictional segments of clutch pins carried in radial holes of the sprocket wheel.

Shown in the figures is a planer drive with a sprocket wheel 1 for a planing chain (not shown) and a drive shaft 2 of the sprocket wheel 1, the sprocket wheel 1 having a secondary chain ring 3 and the drive shaft 2 a primary chain ring 4. Forming a friction clutch, the secondary chain ring 3 has a revolving conical, annular groove 5 associated with a primary chain ring 4. The primary chain ring 4 has radial holes 6, distributed over its circumference, for the accommodation of clutch pins 7. The conical pinheads 8 of the clutch pins 7 can be wedged in the annular groove 5. For this purpose, a freely mounted centering ring 9 with a wedge surface 11 working against the pin bases 10 is radially movable in the primary chain ring 4 by means of a pressure ring 12.

Figure 3:
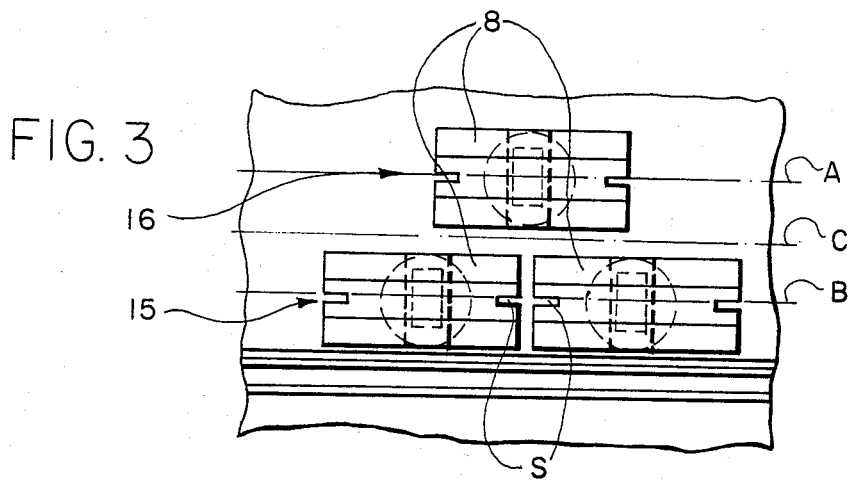
FIG. 3 is a partial top plan view in the area of the friction rings of FIG. 1.

As shown in FIG. 3, the conical pinheads 8 are designed as friction segments attached to the clutch pins 7. On both sides of the clutch pins 7, the friction segments have radial slots S of predetermined width and depth running in circumferential direction. This causes the specific contact pressure at the friction segments to increase up to the slot ends, and oil wedges can form in these areas so that oil planing occurs, as it were, for the uniform absorption of power peaks in the event of overloads.

To achieve an always uniform, soft engagement and reduced specific surface pressures so that the so called emergency operating properties are maintained while forming a continuous oil film, the primary chain ring 4 has, on at least two circles A, B juxtaposed at a predetermined distance, radial holes 6 for the clutch pins 7. The friction segments 8 attached to the clutch pins form two revolving friction rings 15, 16 whose outside flanks 13 work against the annular groove flanks 14.

The secondary chain ring 3 has, on at least one circle C located between the two circles A, B on the primary side, a friction ring 18 which immerses centrally between the friction rings 15 and 16 on the primary side and works against their inside flanks 17 with an appropriate taper. For automatic alignment with or adaptation to the two friction rings 15 and 16 on the primary side and to compensate for possible wear, the friction ring 18 on the secondary side is mounted so as to be axially movable in the annular groove 5. In detail, the secondary chain ring 3 has, distributed over its circumference, on a circle coaxial to the friction ring 18 on the secondary side, radial holes 19 for the accommodation of clutch pins 20 with conical friction segments 21 forming the friction ring 18 on the secondary side.

In addition, a particularly high adaptability between the friction rings 15,16 and 18 is thus achieved, The friction segments 8 are mutually staggered in accordance with the sprocket wheel gaps. The pin bases 10 of the clutch pins 7 disposed on the two juxtaposed circles A,B rest against the wedge surface 11 of the axially/- radially movable centering ring, or chain ring 4, thus being radially movable themselves. The friction ring 18 on the secondary side may be divided into three, four, or more friction segments 21, with each of which are associated several clutch pins 20 fixed in their radial holes to fix these friction segments 21 in circumferential direction. In addition, the annular groove 5 has a revolving bearing recess 22 of predetermined width for the axial mobility of the friction segments 21 on the secondary side whose clutch pins 20 engage this bearing recess 22. However, the friction segments 21 on the secondary side have in their base area appropriate cross slots 23 for the engaging clutch pins 20 so as not to disturb the axial mobility.

While a specific embodiment of the invention has been shown and described in detail to illustrate the application of the principles of the invention, it will be understood that the invention may be embodied otherwise without departing from such principles.

What is claimed is:

1. A planar drive, comprising a sprocket wheel for a planing chain and a driveshaft for the sprocket wheel, said sprocket wheel having a secondary chain ring and said drive shaft a primary chain ring, said secondary chain ring having a revolving, conical, annular groove associated with said primary chain ring and having radial holes distributed over its circumference and associated with the annular groove of clutch pins in said radial holes having conical pinheads wedgeable in the annular groove, a freely mounted centering ring with a wedge surface working against the bases of said pin and axially and radially adjustable in said primary chain ring of a pressure ring over said primary chain ring having conical pin heads in the form of clutch pins with friction segments attached to said clutch pins, said primary chain ring having radial holes for said clutch pins arranged on at least two circles juxtaposed at a predetermined distance, said friction segments being attached to said clutch pins and forming two revolving friction rings whose outer flanks work against the sides of said annular groove, said secondary chain ring having at least on one circle located in projection between the two circles on the primary side, a friction ring immersing centrally between the two friction rings on the primary side and working with an appropriate amount of taper against the inner flanks of the latter, and in that the friction ring on the secondary side is mounted so as to be axially movable in the annular groove.

2. A planer drive according to claim 1, wherein said secondary chain includes on a circle coaxial to said friction ring on the secondary side a plurality of radially extending clutch pin holes each having a clutch pin therein with conical frictional segment head portions forming said friction ring on the secondary side, said radial holes being distributed over the circumference of said secondary chain ring.

3. A planar drive according to claim 1, wherein said frictional segments of said friction rings on the primary side are spaced apart in accordance with the sprocket wheel gaps.

4. A planer drive according to claim 1, wherein said friction ring on the secondary side is divided to at least three frictional segments with each segment having clutch pins in the radially extending holes thereof.

5. A planar drive according to claim 1, wherein said annular groove has a revolving bearing recess of predetermined width for the axial mobility of said frictional segments on the secondary side, said pins having bases engaging the bearing recess.

6. A drive for a planer, a comprising a drive shaft having an end with a cylindrical primary chain ring portion having a plurality of radially extending circumferentially spaced clutch pin bores, a centering ring disposed between said primary chain ring portion and said drive shaft and having a wedge shaped clutch pin bearing surface, a clutch in each of said bores having bases bearing on said clutch pin rings, said pins having conically shaped head portions extending radially out of said chain ring portion, a sprocket wheel having a secondary chain ring with a revolving surface overlying said chain ring portion and having a wedge-shaped counter clutch groove therein, a plurality of circumferentially spaced radially extending counter clutch pin holes in said secondary chain ring portion opening into said counter clutch groove, a clutch pin in each of said counter clutch grooves and having a counter clutch pinhead frictionally engaged with respective head portions of said clutch pins for applying the wedge shaped head portions against said wedge shaped sided counter groove, and adjustable pressure ring means bearing axially said centering ring for radially positioning said clutch pins.

* * * * *